H. M. FRIESLEBEN.
FLUSH TANK CONTROL.
APPLICATION FILED APR. 24, 1916.
1,261,378.
Patented Apr. 2, 1918.
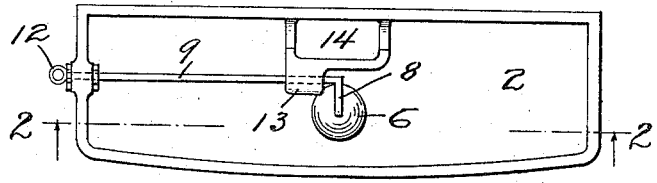
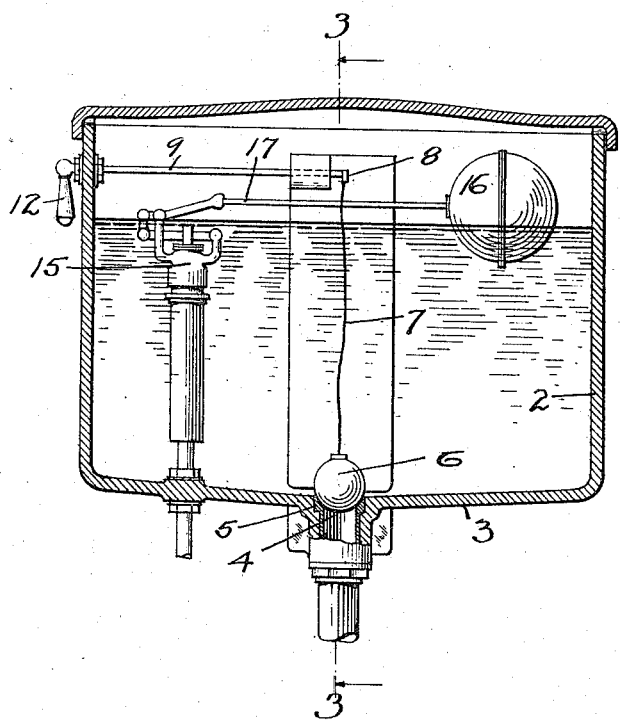
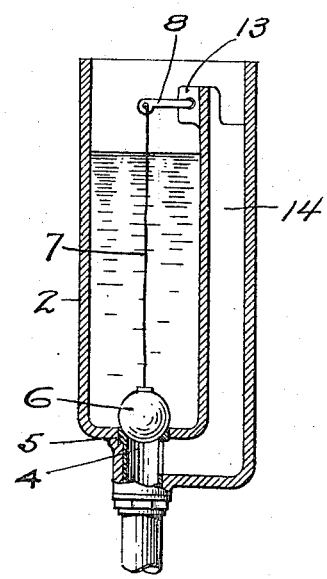
WITNESS
J. B. Gardner
INVENTOR.
H. M. FRIESLEBEN
BY White & Prost.
HIS ATTORNEYS.

UNITED STATES PATENT OFFICE.

HAROLD M. FRIESLEBEN, OF SAN FRANCISCO, CALIFORNIA.

FLUSH-TANK CONTROL.

1,261,378.  Specification of Letters Patent.  Patented Apr. 2, 1918.

Application filed April 24, 1916. Serial No. 93,145.

*To all whom it may concern:*

Be it known that I, HAROLD M. FRIESLEBEN, a citizen of the United States, and a resident of the city and county of San Francisco, State of California, have invented a new and useful Flush-Tank Control, of which the following is a specification.

The invention relates to means for controlling the discharge of water from flush tanks which are used in connection with toilets and other devices and comprises a buoyant valve adapted to close the discharge outlet and means for unseating the valve.

An object of the invention is to provide a simple and cheap flush tank control of the class described.

Another object of the invention is to provide a flush tank discharge controlling means which obviates the use of packing or stuffing boxes.

The invention possesses other advantageous features, some of which, with the foregoing will be set forth at length in the following description where I shall outline in full that form of the invention which I have selected for illustration in the drawings accompanying and forming part of the present specification. In said drawings, I have shown only one specific form of my generic invention, but it is to be understood that the invention may be embodied in a multiplicity of forms, each comprising a species of my invention.

In said drawings:

Figure 1 is a plan or top view of a flush tank embodying my invention, the inlet valve mechanism and the cover being omitted.

Fig. 2 is a vertical section taken on the line 2—2 Fig. 1, showing the discharge control, the inlet valve mechanism and the cover.

Fig. 3 is a vertical section taken on the line 3—3 Fig. 2.

In accordance with my invention the flush tank 2 is provided with a bottom 3 which preferably slopes downward toward a central discharge opening 4. The opening is provided with a valve seat 5 of suitable material to form a tight joint with the valve. Seated on the valve seat and normally closing the discharge opening 4 is a buoyant valve 6, having a spherical surface adapted to engage the seat. In the present instance, the valve 6 is a hollow rubber ball and the valve seat is formed of metal, but the valve may be a hollow metallic body of spherical or hemi-spherical shape and the valve seat may be formed of rubber.

Novel means are employed for unseating the valve from its seat to permit the water to discharge from the tank. Connected to the valve is a pliant unseating line 7 of suitable material, such as gut or a very flexible unkinkable wire or chain. It is essential that the unseating line be pliant and flexible to permit the valve to float to the surface of the water in the tank and it is necessary that the line does not kink or tangle, since such an occurrence would result in the shortening of the line, which would prevent the valve from seating when the water had discharged. The length of the line is such that it cannot lodge between the valve and the seat and thereby prevent the proper seating of the valve. The valve is unseated by pulling up the line a short distance and any suitable means may be employed for this purpose. In the drawings I have shown the line attached to a lever 8 formed on the end of a rod 9 which extends through the side wall of the tank and is provided on the outside with a handle 12, but I do not limit myself in any way to this construction. The rod 9 is supported within the tank in a bracket 13 formed on the wall of the integral overflow passage 14. My invention, however, is not limited for use in connection with any specific overflow and any type of overflow passage may be used or not.

Water is admitted to the tank through the valve 15, which is controlled by the float 16, and the valve is preferably arranged so that the rod 17 connecting the float to the valve lies above or adjacent the surface of the water in the tank, so that the buoyant valve cannot float over the rod and thereby wrap the line around it. When the line is pulled, the valve is unseated and floats to the surface and when the level of the water has fallen a sufficient distance, the flow of the water toward the outlet draws the valve to the outlet and causes it to seat thereon.

I claim:

1. In a flush tank having a discharge outlet, inclined bottom walls sloping to said outlet, a loose buoyant valve adapted to seat on said outlet and a pliant unseating line attached to said valve.

2. In a flush tank having a discharge outlet, inclined bottom walls sloping to said outlet, a loose buoyant valve adapted to seat on said outlet and an unseating line of unkinkable material attached to said valve so that when unseated the valve will rise to the surface of the liquid in the tank.

In testimony whereof, I have hereunto set my hand at San Francisco, California, this 18th day of April, 1916.

HAROLD M. FRIESLEBEN.

In presence of—
H. G. PROST.

Copies of this patent may be obtained for five cents each, by addressing the "Commissioner of Patents, Washington, D. C."